United States Patent
Ageishi (10) Patent No.: US 9,501,372 B2
(45) Date of Patent: Nov. 22, 2016

(54) CLUSTER SYSTEM INCLUDING CLOSING A BUS USING AN UNCORRECTABLE FAULT UPON A FAULT DETECTION IN AN ACTIVE SERVER

(71) Applicant: NEC CORPORATION, Tokyo (JP)

(72) Inventor: Daisuke Ageishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 135 days.

(21) Appl. No.: 14/482,020

(22) Filed: Sep. 10, 2014

(65) Prior Publication Data
US 2015/0074448 A1    Mar. 12, 2015

(30) Foreign Application Priority Data

Sep. 12, 2013    (JP) ................................. 2013-189298

(51) Int. Cl.
*G06F 11/07*     (2006.01)
*G06F 11/20*     (2006.01)
*G06F 13/24*     (2006.01)
*H04L 12/24*     (2006.01)

(52) U.S. Cl.
CPC ....... *G06F 11/2007* (2013.01); *G06F 11/0709* (2013.01); *G06F 11/0784* (2013.01); *G06F 13/24* (2013.01); *G06F 2201/805* (2013.01); *H04L 41/0659* (2013.01)

(58) Field of Classification Search
CPC ........... H04L 41/0659; H04L 41/0654; H04L 41/0672; H04L 41/0686; G06F 11/0709; G06F 11/0706
See application file for complete search history.

(56) References Cited

U.S. PATENT DOCUMENTS

| | | | | |
|---|---|---|---|---|
| 6,832,343 B2* | 12/2004 | Rupp | ................ | G05B 9/03 700/21 |
| 2005/0083834 A1* | 4/2005 | Dunagan | ............ | G06F 11/0709 370/221 |
| 2005/0246568 A1* | 11/2005 | Davies | ................ | G06F 11/0709 714/2 |
| 2005/0268153 A1* | 12/2005 | Armstrong | .......... | G06F 11/0709 714/4.1 |
| 2008/0016405 A1* | 1/2008 | Kitahara | ............. | G06F 11/0745 714/43 |
| 2009/0119546 A1* | 5/2009 | Ageishi | ............... | G06F 11/1441 714/43 |

FOREIGN PATENT DOCUMENTS

JP    2004-252591    9/2004
JP    2012-173752    9/2012

* cited by examiner

*Primary Examiner* — Joseph Schell
(74) *Attorney, Agent, or Firm* — Young & Thompson (57) ABSTRACT

The present invention provides a cluster system that promptly stops access to a shared disk upon occurrence of abnormality. The cluster system is a cluster system where an active system server and a standby system server operate utilizing a shared disk. Each server includes: a disk input/output unit that accesses the shared disk by using data that is input and output via a predetermined bus; a fault detecting unit that, when a fault occurs in the active system server, detects the fault; and a bus closing unit that, when the fault detecting unit detects the fault, closes the bus by issuing an uncorrectable fault generation request to cause generation of an uncorrectable fault on the bus.

7 Claims, 6 Drawing Sheets

CLUSTER SYSTEM INCLUDING CLOSING A BUS USING AN UNCORRECTABLE FAULT UPON A FAULT DETECTION IN AN ACTIVE SERVER

This application is based upon and claims the benefit of priority from Japanese Patent Application No. 2013-189298, filed on Sep. 12, 2013, the disclosure of which is incorporated herein in its entirety by reference.

TECHNICAL FIELD

The present invention relates to a cluster system, an information processing device, a method of controlling the cluster system, and a program thereof, which are preferably used in a shared disk type cluster system that includes a failover function.

BACKGROUND ART

There has been known a shared disk type cluster system that comprises both active system and standby system servers and a shared disk to prevent the system from stopping due to occurrence of a fault in a computer (for example, Patent Literature 1, Patent Literature 2 and the like). In such a shared disk type cluster system, data of a business application running on both servers is stored in a shared disk that is accessible both from the active system server and from the standby system server.

Then, when a fault occurs in the active system server, a cluster software activates the business application in the standby system server to switch the business application. The business application activated in the standby system server uses the data stored in the shared disk to resume a business processing from a point where the business application of the active system server stops.

In the shared disk type cluster system, the active system server and the standby system server respectively store data in the shared disk. As such, there is a risk that the data may be destructed when the both active system and standby system servers simultaneously write in the shared disk. Therefore, exclusive control is performed in order that writing is performed only from the active system server in normal operation.

When performing a failover in the shared disk type cluster system, the exclusive control needs to be appropriately performed to securely stop a failed server from accessing the shared disk. There are mainly the following four approaches as a method to stop access to the shared disk in the shared disk type cluster system, each of which has a problem:

i) Unmounting the Disk

Processing of unmounting a disk takes time. Further, the unmounting processing fails when there is an ongoing writing process.

ii) Closing a Port of Fiber Channel (FC) Switch

Since a server connects to a module outside the server, connection takes time. Further, depending on a type of fault, the server cannot connect to the FC switch.

iii) OS (Operating System) Panic

I/O (input/output) data that remains in a cache of a HBA (Host Bus Adapter) card may possibly be written in the shared disk. Further, even when access to the shared disk can be stopped, a failover cannot be performed in high speed since the failover is caused by the OS panic.

iv) Stopping by a BMC (Baseboard Management Controller; Onboard Server Management Chip)

In a method that the BMC forcibly resets the HBA card or blocks a power supply to the HBA card, when the BMC is busy, stopping access to the shared disk takes time, thus, the failover cannot be performed in high speed. Further, since the BMC forcibly stops the access in a timing that the OS or a driver cannot recognize the BMC, the OS panic occurs, thereby taking time for the failover. Moreover, when the BMC is inactive, the access to the shared disk is not stopped, nor occurs the failover.

CITATION LIST

Patent Literature

[PTL 1] Japanese Patent Application Laid-Open No. 2004-252591
[PTL 2] Japanese Patent Application Laid-Open No. 2012-173752

SUMMARY

An example of the objective of the present invention is to provide a cluster system, an information processing device, a method of controlling the cluster system, and a program thereof, which can immediately stop access to a shared disk.

A cluster system according to one aspect of the present invention where an active system server and a standby system server operate utilizing a shared disk, each of the servers includes:

a disk input/output unit that accesses the shared disk by using data that is input and output via a predetermined bus;
a fault detecting unit that, when a fault occurs in the active system server, detects the fault; and
a bus closing unit that, when the fault detecting unit detects the fault, closes the bus by issuing an uncorrectable fault generation request to cause generation of an uncorrectable fault on the bus.

A method of controlling a cluster system, according to one aspect of the present invention, wherein, in a cluster system where an active system server and a standby system server operate utilizing a shared disk, each of the servers includes: a disk input/output unit that accesses the shared disk by using data that is input and output via a predetermined bus; a fault detecting unit that, when a fault occurs in the active system server, detects the fault; and a bus closing unit, and,
when the fault detecting unit detects the fault, the bus closing unit of each of the servers closes the bus by issuing an uncorrectable fault generation request to cause generation of an uncorrectable fault on the bus.

A non-transitory computer-readable recording medium according to one aspect of the present invention that stores a control program of a cluster system, wherein, in a cluster system where an active system server and a standby system server operate utilizing a shared disk, each of the servers includes: a disk input/output unit that accesses the shared disk by using data that is input and output via a predetermined bus; a fault detecting unit that, when a fault occurs in the active system server, detects the fault; and a bus closing unit, and,
the control program causes a computer to execute a process in which the bus closing unit of each of the servers, when the fault detecting unit detects the fault, closes the bus by issuing an uncorrectable fault generation request to cause generation of an uncorrectable fault on the bus.

BRIEF DESCRIPTION OF THE DRAWINGS

Exemplary features and advantages of the present invention will become apparent from the following detailed description when taken with the accompanying drawings in which.

EXEMPLARY EMBODIMENT

Figure 1:
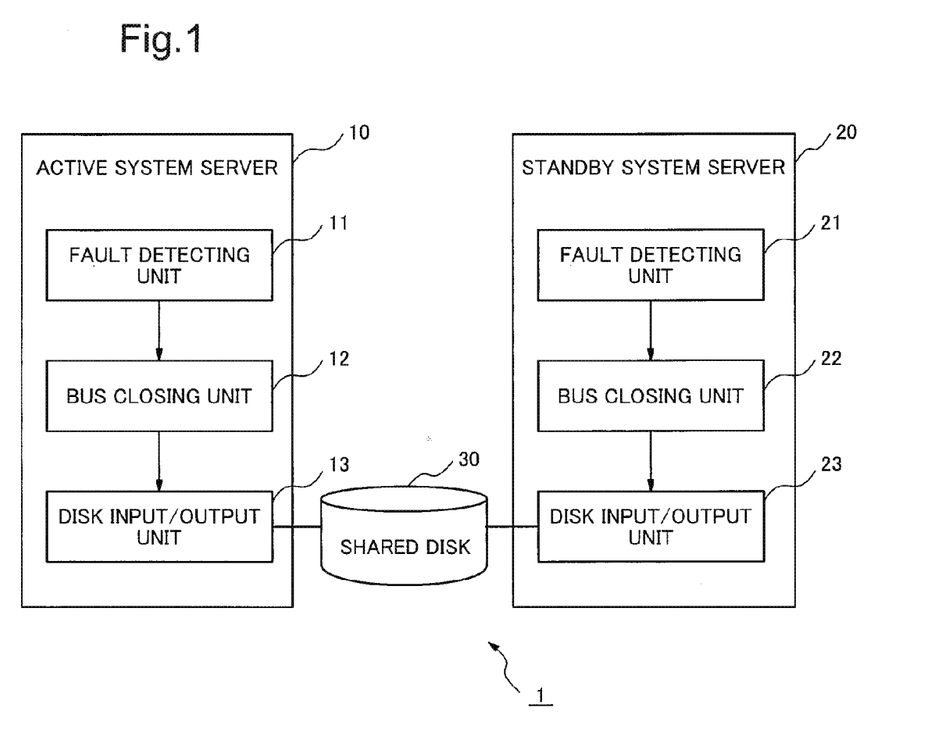
FIG. 1 is a block diagram depicting a basic configuration example of a cluster system according to an exemplary embodiment.

The following will describe an exemplary embodiment with reference to the drawings. FIG. 1 is a block diagram depicting a basic configuration example of one exemplary embodiment of a cluster system. The cluster system 1 depicted in FIG. 1 includes an active system server 10, a standby system server 20, and a shared disk 30. This cluster system 1 configures a shared disk type cluster system that includes both active system and standby system servers 10 and 20 and a shared disk 30 to prevent the system from stopping due to occurrence of a fault in a computer. In the cluster system 1, data of a business application running on the both servers is stored in the shared disk 30 that is accessible both from the active system server 10 and from the standby system server 20.

The active system server 10 includes a fault detecting unit 11, a bus closing unit 12, and a disk input/output unit 13. The standby system server 20 includes a fault detecting unit 21, a bus closing unit 22, and a disk input/output unit 23. The fault detecting unit 21, the bus closing unit 22, and the disk input/output unit 23 respectively have the same configurations as the fault detecting unit 11, the bus closing unit 12, and the disk input/output unit 13, which are included in the active system server 10.

The disk input/output unit 13 accesses the shared disk 30 using data that is input and output via a predetermined bus. The disk input/output unit 23 also accesses the shared disk 30 using data that is input and output via a predetermined bus.

The fault detecting unit 11 of the active system server 10 detects a fault when the fault occurs in the active system server 10. The fault detecting unit 21 of the standby system server 20 also detects a fault when the fault occurs in the standby system server 20. The fault detecting unit 21 of the standby system server 20 detects a fault in the standby system server 20 when the processing is succeeded thereto by a failover due to occurrence of a fault in the active system server 10. The fault detecting unit 11 and the fault detecting unit 21 may either jointly operate to detect occurrence of a fault in each server, or independently detect occurrence of a fault in each server.

When the fault detecting unit 11 detects a fault in the active system server 10, the bus closing unit 12 issues an uncorrectable fault generation request for generating an uncorrectable fault on a predetermined bus. The predetermined bus is a bus for inputting/outputting data from/to the disk input/output unit 13. For example, upon receiving an uncorrectable fault generation request, a control device of the bus included in the disk input/output unit 13 generates an uncorrectable fault (or recognizes that an uncorrectable fault occurs), then, closes the bus. Likewise, when the fault detecting unit 21 detects a fault in the standby system server 20, the bus closing unit 22 issues an uncorrectable fault generation request for generating an uncorrectable fault on a predetermined bus. The predetermined bus is a bus for inputting/outputting data from/to the disk input/output unit 23. For example, upon receiving an uncorrectable fault generation request, a control device of the bus included in the disk input/output unit 23 generates an uncorrectable fault (or recognizes that an uncorrectable fault occurs), then, closes the bus.

The cluster system 1 depicted in FIG. 1 intentionally generates a fault so as to close the bus caused by occurrence of an uncorrectable fault. Therefore, stopping access to the shared disk can be promptly performed. Note that a request destination of the uncorrectable fault generation request may be the control device of the bus, provided in the disk input/output unit 13 or the like, or, for example, one included in a generally-called integrated circuit group, such as a chip set used in combination with a CPU that is not depicted.

Figure 2:
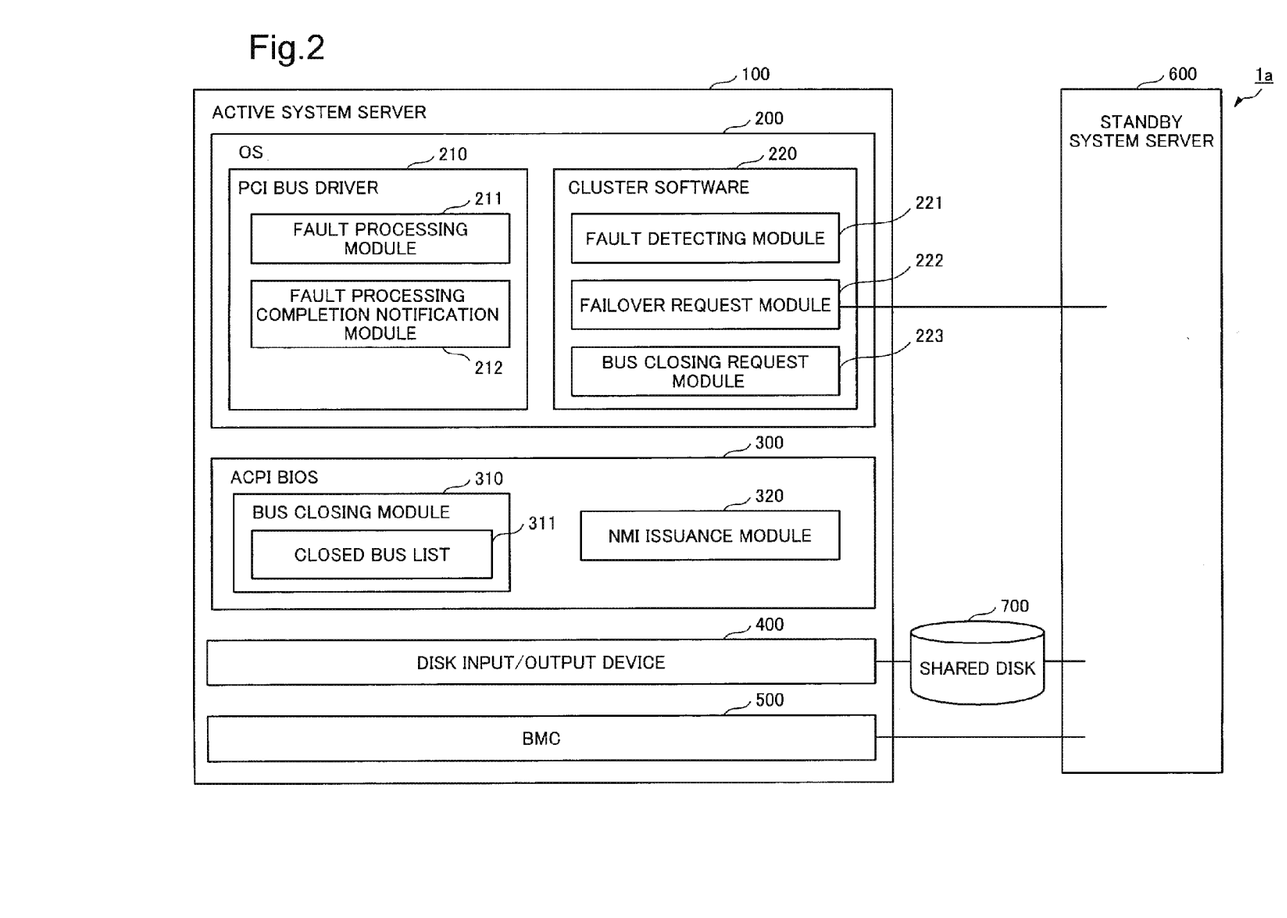
FIG. 2 is a block diagram depicting a configuration example of the exemplary embodiment as an example of the cluster system depicted in FIG. 1.

Next, a detail configuration example of the cluster system 1 described with reference to FIG. 1 will be described with reference to FIGS. 2 to 5. FIG. 2 is a block diagram depicting a cluster system 1a as a configuration example of the cluster system 1 depicted in FIG. 1.

[Description of Configuration of Cluster System 1a]

The cluster system 1a as one exemplary embodiment depicted in FIG. 2 includes an active system server 100 and a standby system server 600 with a failover function that can mutually perform the same application and succeed the processing of the application from the other server. The cluster system 1a further includes a shared disk 700 for storing data that can be shared by the active system server 100 and the standby system server 600. Further, the active system server 100 and the standby system server 600 each include a BMC (also referred to as an onboard server management chip) that controls hardware (HW) and a disk input/output device 400 that accesses the shared disk 700. The cluster system 1a further includes an ACPI (Advanced Configuration and Power Interface) BIOS (Basic Input/Output System) 300 that is an ACPI function provided by a BIOS and an Operating System (OS) 200. The BIOS is a set of modules (a set of programs) that performs a basic input/output control of each of the servers.

The OS 200 includes a PCI (Peripheral Components Interconnect) bus driver 210 and cluster software 220. The PCI bus driver 210 includes a fault processing module 211 that performs fault processing when detecting a fault and a fault processing completion notification module 212. The cluster software 220 includes a fault detecting module 221, a failover request module 222, and a bus closing request module 223. The ACPI BIOS 300 includes a bus closing module 310 that closes a bus and an NMI (Non-Maskable Interrupt) issuance module 320. The bus closing module 310 includes a closed bus list 311.

In the configuration depicted in FIG. 2, the OS 200 and the ACPI BIOS 300 are software (programs) that a CPU, not depicted, included in the active system server 100, executes. The disk input/output device 400 and the BMC 500 are hardware that is connected to the CPU and the like via a predetermined bus or a signal line. In addition, the active system server 100 includes hardware, such as a CPU, a memory, a control device of a bus, and an NIC (Network Interface Card), which are not depicted. Note that, although not depicted, the standby system server 600 also includes the same configuration as the active system server 100.

[Description of Operation of Cluster System 1*a*]

Figure 3:
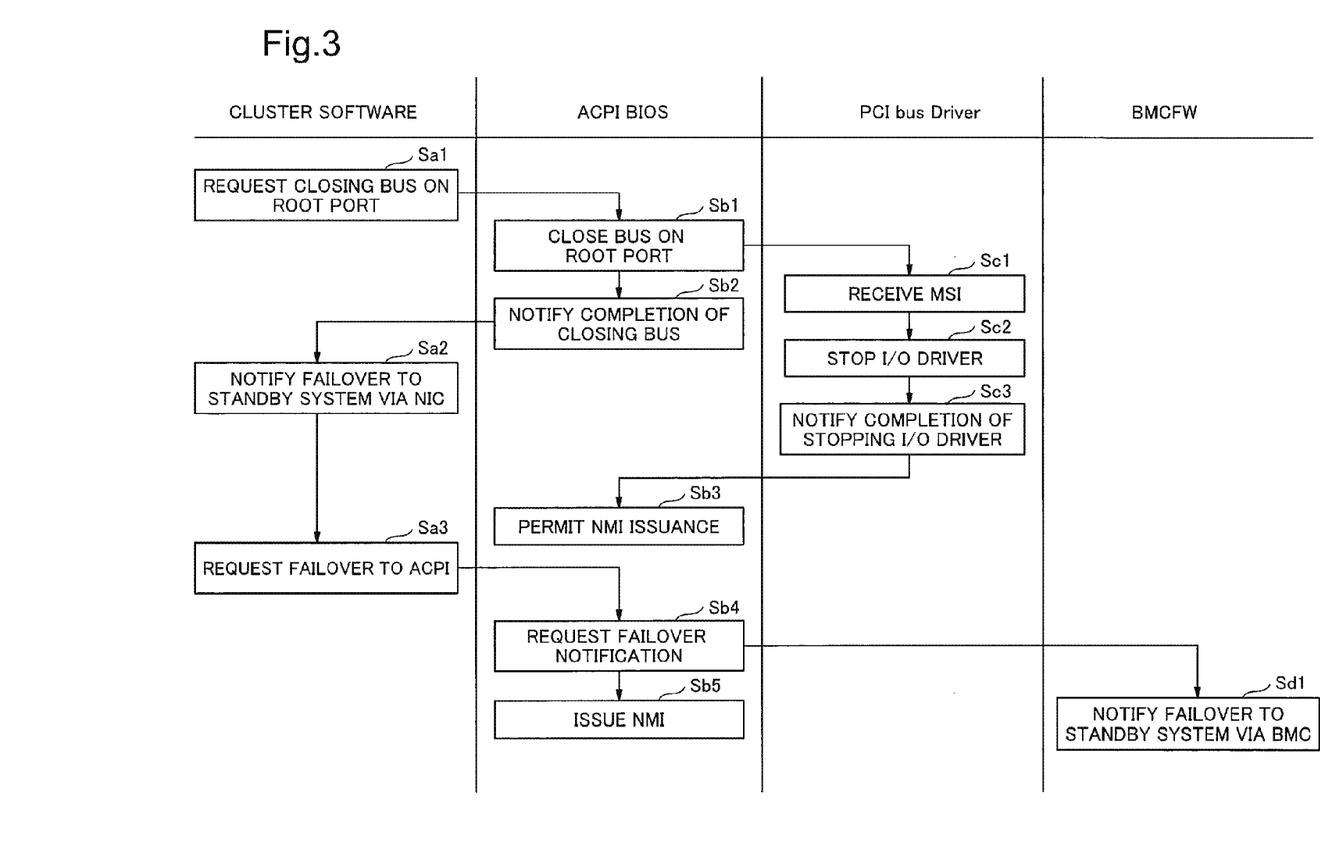
FIG. 3 is a sequence diagram for illustrating an operation example of the cluster system depicted in FIG. 2.

An operation of the present exemplary embodiment will be described in detail with reference to FIGS. 2 and 3. FIG. 3 is a sequence diagram depicting a flow of the operation of the cluster system 1*a*. Note that the disk input/output device 400 includes a PCIe (PCI Express (registered trademark)) card that accesses the shared disk 700, thus, the system takes a PCIe bus structure. With reference to FIG. 3, a flow of the failover operation of the present exemplary embodiment will be described. Note that FIG. 3 depicts the processing by the cluster software 220, the processing by the ACPI BIOS 300, the processing by the PCI bus driver 210, and the processing by firmware of the BMC 500, which are arranged in this order from the left.

(i) When the fault detecting module 221 of the cluster software 220 detects abnormality in the active system server 100, the bus closing request module 223 requests the ACPI BIOS 300 to close a bus (step Sa1). The bus closing module 310 of the ACPI BIOS 300 closes the bus by causing an uncorrectable fault on a target root port (step Sb1). Details of the bus closing processing will be described later herein. The root port is a bedrock port (a fundamental input/output interface) provided on a root complex of the PCIe. Then, upon confirming that the bus is closed, the bus closing module 310 notifies the cluster software 220 of completion of closing the bus (step Sb2).

(ii) When the bus closing is actuated, a PCI device (for example, the PCIe card included in the disk input/output device 400) detects a fault, and notifies a Message Signaled Interrupt (MSI). Then, triggered by reception of the MSI (step Sc1), the fault processing module 211 of the PCI bus driver 210 stops an I/O driver for the PCI device that notifies the MSI (step Sc2). Then, the fault processing completion notification module 212 of the PCI bus driver 210 notifies completion of stopping the I/O driver, to the NMI issuance module 320 of the ACPI BIOS 300 (step Sc3). The NMI issuance module 320 changes a setting state of the NMI issuance, which is unpermitted until the I/O driver stops, to be in permitting issuance of NMI (step Sb3).

(iii) In the cluster software 220, after completion of closing the bus (after step Sb2), the failover request module 222 notifies the standby system of the failover via the NIC (step Sa2). At the same time, the cluster software 220 issues a failover request (alternatively, an NMI issuance request) to the NMI issuance module 320 of the ACPI BIOS 300 (step Sa3). The ACPI BIOS 300 instructs the BMC 500 to notify the standby system server 600 of the failover (steps Sb4 to Sd1).

(iv) Finally, the NMI issuance module 320 of the ACPI BIOS 300 confirms completion of the processing of step Sb3 and then issues a Non-Maskable Interrupt (NMI) to stop the active system (step Sb5).

The following will describe the bus closing processing in detail. The bus closing module 310 uses a Live Error Recovery (LER) function to close a bus. The LER function is a function for preventing an uncorrectable fault that occurs under a PCIe port from affecting the whole system. The bus closing module 310 utilizes this function to close the bus, by issuing an Unsupported Request (UR) to the PCIe port of which bus is to be closed thereby causing an uncorrectable fault.

Figure 4:
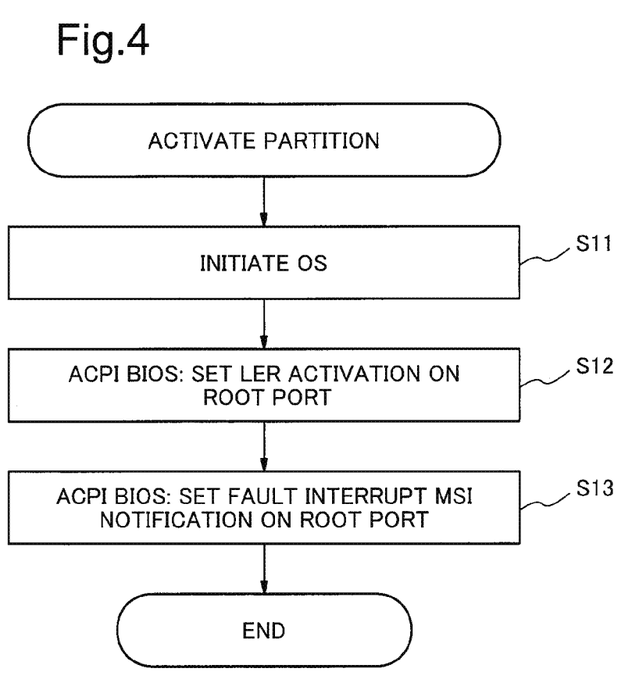
FIG. 4 is a flowchart for illustrating an operation example of the cluster system depicted in FIG. 2.

The bus closing module 310 performs the following initialization processing for the PCIe root port as depicted in FIG. 4, in order to close the bus in response to the bus closing request. In other words, the bus closing module 310 initiates the OS (step S11). Next, the bus closing module 310 performs an LER activation setting in order to close the bus (step S12). Further, the bus closing module 310 performs an MSI notification setting so as to generate an interrupt by MSI upon occurrence of a fault (step S13). For the LER function, description can be found, for example, in item 11.3.2.2.8 of http://www.intel.com/content/dam/www/public/us/en/documents/datasheets/xeon-c5500-c3500-datasheet-vol-1.pdf.

Figure 5:
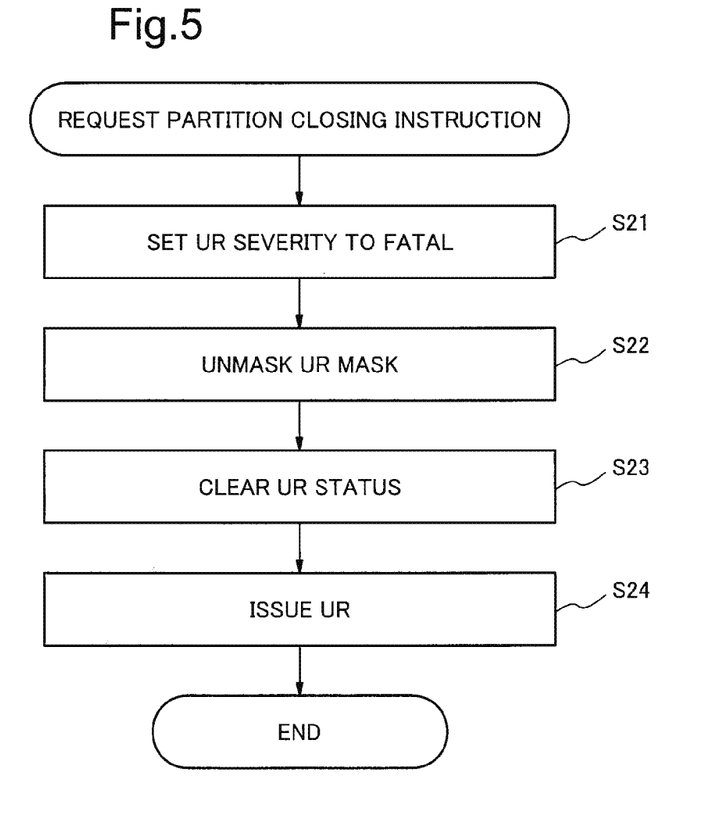
FIG. 5 is another flowchart for illustrating an operation example of the cluster system depicted in FIG. 2.

Upon receiving a bus closing instruction, the bus closing module 310 intentionally generates a fault with a procedure as depicted in FIG. 5. In order to generate an uncorrectable fault on the PCIe root port, in the present exemplary embodiment, the bus closing module 310 throws an Unsupported Request (UR) as fatal severity in the PCI device, thereby generating an uncorrectable fault. The PCI device detects a UR fault when there is a PCI Config (PCI configuration register) access request to an unsupported device or function. Since this error is detected when the OS 200 or the ACPI BIOS 300 performs a device search, the error is normally masked so that the OS 200 and the ACPI BIOS 300 do not detect the error. Further, when the PCI device supports advisory non-fatal error logging, a fault with non-fatal severity leads to a correctable notification, which cannot cause closing of the bus. As such, the UR fault needs to be treated as fatal severity. Therefore, the bus closing module 310 changes a UR severity to fatal (step S21) and unmasks a UR mask (step S22), before clearing a UR status (step S23) and generating the UR (step S24). In this way, the bus closing module 310 causes the closing of the bus.

Note that in the flow described with reference to FIG. 3, after the bus closing module 310 receives a bus closing request (step Sa1), the bus closing module 310 can notify the NMI issuance module 320 of a bus closing target (not depicted in FIG. 3). The NMI issuance module 320 stores the notified bus closing target in the closed bus list 311. When receiving an I/O driver termination completion notification from the fault processing completion notification module 212 of the PCI bus driver 210 (step Sc3), the NMI issuance module 320 deletes the notified bus closing target from the list 311 (not depicted in FIG. 3). When receiving a failover request from the failover request module 222 of the cluster software 220 (step Sa3), the NMI issuance module 320 waits until the closed bus list 311 becomes empty, before performing the next processing. In other words, the NMI issuance module 320 notifies the BMC 500 of a failover from the active system to the standby system (steps Sb4 to Sd1), and issues an NMI to the active system (step Sb5).

[Description of Effects of Cluster System 1*a*]

The cluster system 1*a* depicted in FIG. 2 provides the following effects.

The first effect is that the shared data is protected by instantaneously closing the bus in the active system server independent from other control devices such as the BMC thereby stopping access to the shared disk. This effect is brought about by a mechanism included in the present exemplary embodiment in which the ACPI BIOS 300 intentionally causes an uncorrectable fault to close the bus on the root port.

The second effect is that the system can be safely terminated, by stopping the I/O driver on the OS after closing the bus. This effect is brought about by a mechanism included in the present exemplary embodiment in which the NMI issuance module 320 of the ACPI BIOS 300 waits for completion of the I/O driver stopping processing and adjusts the NMI issuance timing.

Then, the third effect is that the failover instruction can be made redundant by notifying the failover from both the cluster software 220 and the BMC 500. This effect is brought about by a mechanism included in the present exemplary embodiment in which the NMI issuance module 320 of the ACPI BIOS 300 notifies the failover.

As described above, according to the present exemplary embodiment, access to a shared disk can be stopped instantaneously and securely in a shared disk type cluster system, by the ACPI BIOS closing a bus as well as stopping a driver in terms of hardware. Further, according to the present exemplary embodiment, a secure failover is made possible by enabling both the cluster software and the BMC to instruct a failover to the standby system.

Note that the cluster system 1a can be realized by executing a program made of one or a plurality of modules by using various hardware resources, such as a CPU mounted on a server. In such a case, a part or whole of the program can be distributed via a non-transitory computer-readable recording medium or a communication line.

Further, the exemplary embodiment is not limited to the above. For example, the specification of the bus may be other than the PCIe bus as long as an uncorrectable fault can be intentionally generated.

Figure 6:
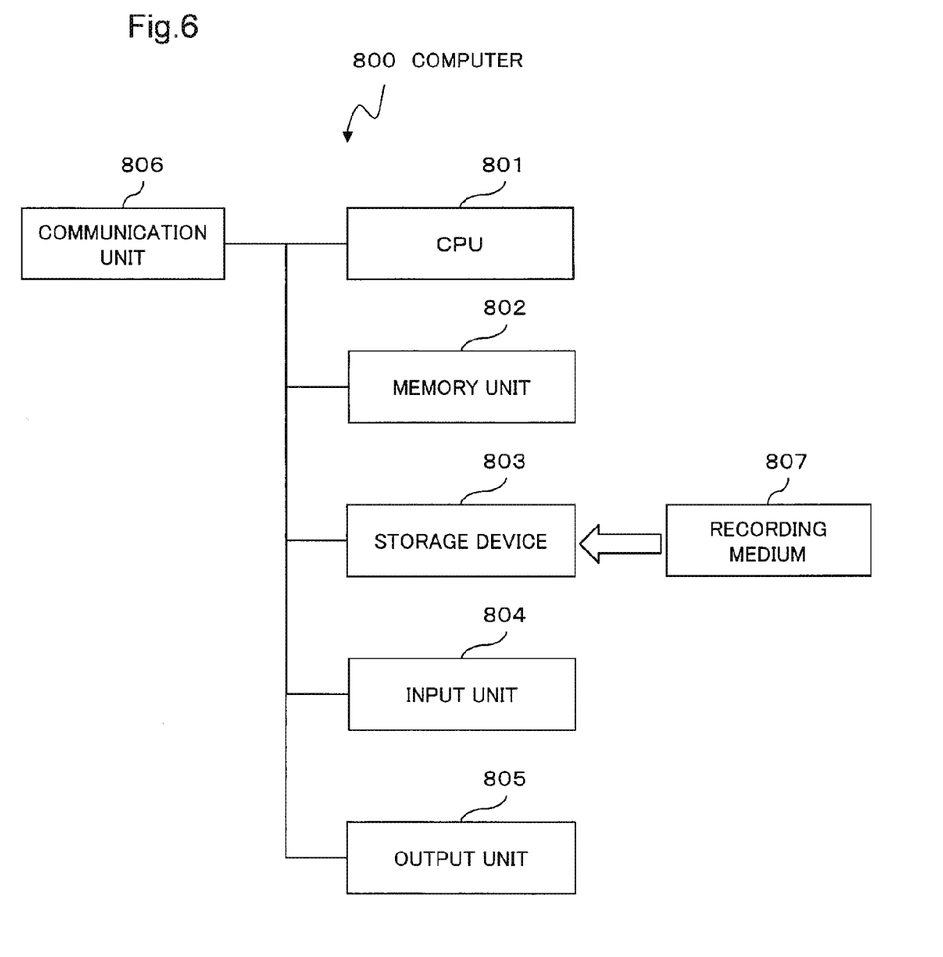
FIG. 6 is a block diagram depicting a hardware configuration example of a computer.

FIG. 6 is a diagram showing a hardware configuration sample of a computer 800 and its peripheral devices which realizes the active system server 10 and the standby system server 20 in this exemplary embodiment. As shown in FIG. 6, computer 800 includes a CPU (Central Processing Unit) 801, a memory unit 802, a storage device 803, an input unit 804, an output unit 805 a communication unit 806 and a recording medium 807.

The CPU 801 operates an operating system (not shown) and controls a whole operation of computer 800 related to this exemplary embodiment. The CPU 801 reads programs and data to the memory unit 802 from the recording medium 807 loaded on the storage device 803, for example. And the CPU 801 executes various processing as the fault detecting unit 11, the bus closing unit 12, and the disk input/output unit 13 shown in FIG. 1 following the read program, and based on the read data. And the CPU 801 executes various processing as the fault detecting unit 21, the bus closing unit 22, and the disk input/output unit 23 shown in FIG. 1 following the read program, and based on the read data.

Alternatively, the CPU 801 may download optional one among programs and data to the memory unit 802 from an external computer (not shown) connected to a communication network (not shown).

The memory unit 802 stores optional one among programs and data.

For example, the storage devices 803 is an optical disc, a flexible disc, a magnetic optical disc, an external hard disk, or a semiconductor memory, and includes a non-volatile storage medium. The storage device 803 records a program so that it is computer-readable. The storage device 803 may record data so that it is computer-readable.

The input unit 804 is realized by a mouse, a keyboard, or a built-in key button, for example, and used for an input operation. The input unit 804 is not limited to a mouse, a keyboard, or a built-in key button; it may be a touch panel for example.

The output unit 805 is realized by a display for example.

The communication unit 806 communicates with the active system server 10 between the standby system server 20.

The above is the description about each component of a hardware unit of the computer 800.

As described above, blocks of the function unit shown in FIG. 1 are realized by a hardware configuration shown in FIG. 6. However, a realization means for each unit provided in the computer 800 is not limited to the above. That is, the computer 800 may be realized by one device coupled physically, or two or devices separated physically are connected by a wire or a wireless, and it may be realized by these a plurality of devices.

The recording medium 807 is a non-transitory computer-readable recording medium storing information non-temporarily. Alternatively, the recording medium 807 may be a recording medium storing information temporarily. The recording medium 807 records a code of a program (software) which makes the computer 800 (CPU 801) execute operation shown in FIG. 5. In addition, the recording medium 807 may further record optional programs and data.

Moreover the recording medium 807 in which a code of the above-mentioned program (software) was recorded is supplied to the computer 800, and the computer 800 (CPU 801) may read the code of the program stored in the recording medium and execute it. Alternatively, The CPU 801 may store a code of a program stored in the recording medium 807 in the memory unit 802. That is, this exemplary embodiment includes an exemplary embodiment of a recording medium which stores a program temporarily or non-temporarily which the computer 800 (CPU 801) executes.

The correspondence relationship between the statement in the scope of claims and each component of the above-described exemplary embodiment is as follows. The "disk input/output unit" in the claims corresponds to the "disk input/output unit 13", "disk input/output unit 23", and "disk input/output device 400". The "fault detecting unit" in the claims corresponds to the "fault detecting unit 11", "fault detecting unit 21", and "fault detecting module 221". The "bus closing unit" in the claims corresponds to the "bus closing unit 12", "bus closing unit 22", and "bus closing module 310". The "input/output control unit" in the claims corresponds to the "I/O driver" of steps Sc2 and Sc3 in FIG. 3. The "fault interrupt signal" in the claims corresponds to the "MSI" of step Sc1 in FIG. 3. The "uncorrectable fault generation request" in the claims corresponds to the "UR" of step S24 in FIG. 5. The "interrupt signal issuance unit" in the claims corresponds to the "NMI issuance module 320". The "non-maskable interrupt signal" in the claims corresponds to the "NMI" of step Sb5 in FIG. 3. The "failover notification request signal" in the claims corresponds to the "failover notification request" of step Sb4 in FIG. 3. Then, "a set of modules that performs a basic input/output control" in the claims corresponds to the "ACPI BIOS 300".

A second exemplary embodiment of the invention is an information processing device that is a server used in a cluster system where an active system server and a standby system server operate utilizing a shared disk, the information processing device including:

a disk input/output unit that accesses the shared disk by using data that is input and output via a predetermined bus;

a fault detecting unit that, when a fault occurs in the active system server, detects the fault; and a bus closing unit that, when the fault detecting unit detects the fault, closes the bus by issuing an uncorrectable fault generation request to cause generation of an uncorrectable fault on the bus.

The cluster system described in the above-described Patent Literature 1 and Patent Literature 2 employs a method of unmounting a disk as an approach of stopping access to the shared disk. Thus, the cluster system has a problem of taking time until access to the shared disk is stopped.

An example of the effects of the present invention is that access to the shared disk can be promptly stopped.

The whole or part of the exemplary embodiments disclosed above can be described as, but not limited to, the following supplementary notes.

(Supplementary note 1) A cluster system where an active system server and a standby system server operate utilizing a shared disk, each of the servers comprising:
 a disk input/output unit that accesses the shared disk by using data that is input and output via a predetermined bus;
 a fault detecting unit that, when a fault occurs in the active system server, detects the fault; and
 a bus closing unit that, when the fault detecting unit detects the fault, closes the bus by issuing an uncorrectable fault generation request to cause generation of an uncorrectable fault on the bus.

(Supplementary note 2) The cluster system according to Supplementary note 1, wherein each of the servers further comprises:
 an input/output control unit that controls input and output of data for the bus and, when an fault interrupt signal for notifying generation of a fault on the bus is issued, stops control operation of input and output of data for the bus; and
 an interrupt signal issuance unit that, when the bus closing unit issues the uncorrectable fault generation request, waits until the control operation of the input/output control unit stops, and issues a non-maskable interrupt signal for stopping the active system server to the active system server.

(Supplementary note 3) The cluster system according to Supplementary note 2, wherein, before issuing the non-maskable interrupt signal, the interrupt signal issuance unit issues a failover notification request signal that requests notification of a failover from the active system server to the standby system server.

(Supplementary note 4) The cluster system according to Supplementary note 2, wherein
 each of the servers further comprises a communication device and an onboard server management chip,
 a failover is requested from the active system server to the standby system server, after the bus is closed, via the communication device of each of the servers, and
 the failover is notified from the active system server to the standby system server, after the input/output control unit stops, via the onboard server management chip of each of the servers.

(Supplementary note 5) The cluster system according to Supplementary note 1, wherein a program that configures the bus closing unit is included in a set of modules that performs a basic input/output control of each of the servers.

(Supplementary note 6) An information processing device that is a server used in a cluster system where an active system server and a standby system server operate utilizing a shared disk, the information processing device comprising:
 a disk input/output unit that accesses the shared disk by using data that is input and output via a predetermined bus;
 a fault detecting unit that, when a fault occurs in the active system server, detects the fault; and
 a bus closing unit that, when the fault detecting unit detects the fault, closes the bus by issuing an uncorrectable fault generation request to cause generation of an uncorrectable fault on the bus.

(Supplementary note 7) A method of controlling a cluster system, wherein,
 in a cluster system where an active system server and a standby system server operate utilizing a shared disk, each of the servers includes: a disk input/output unit that accesses the shared disk by using data that is input and output via a predetermined bus; a fault detecting unit that, when a fault occurs in the active system server, detects the fault; and a bus closing unit, and,
 when the fault detecting unit detects the fault, the bus closing unit of each of the servers closes the bus by issuing an uncorrectable fault generation request to cause generation of an uncorrectable fault on the bus.

(Supplementary note 8) A non-transitory computer-readable recording medium that stores a control program of a cluster system, wherein,
 in a cluster system where an active system server and a standby system server operate utilizing a shared disk, each of the servers includes: a disk input/output unit that accesses the shared disk by using data that is input and output via a predetermined bus; a fault detecting unit that, when a fault occurs in the active system server, detects the fault; and a bus closing unit, and,
 the control program causes a computer to execute a process in which the bus closing unit of each of the servers, when the fault detecting unit detects the fault, closes the bus by issuing an uncorrectable fault generation request to cause generation of an uncorrectable fault on the bus.

While the present invention has been described with reference to the exemplary embodiments above, the present invention is not limited to the above-mentioned embodiments. Various changes in form and details of the present invention which can be understood by those skilled in the art may be made therein without departing from the spirit and scope of the present invention.

DESCRIPTION OF NUMERALS AND SIGNS 1, 1a cluster system
10, 100 active system server
20, 600 standby system server
11, 21 fault detecting unit
12, 22 bus closing unit
13, 23 disk input/output unit
30, 700 shared disk
200 OS
210 PCI bus driver
220 cluster software
221 fault detecting module
223 bus closing request module
300 ACPI BIOS
310 bus closing module
400 disk input/output device
500 BMC
800 computer
801 CPU
802 memory unit 803 storage device
804 input unit
805 output unit
806 communication unit
807 recording medium

The invention claimed is:

1. A cluster system where an active system server and a standby system server operate utilizing a shared disk, each of the servers comprising:
 a disk input/output unit that accesses the shared disk by using data that is input and output via a predetermined bus;
 a fault detecting unit that, when a fault occurs in the active system server, detects the fault; and
 a bus closing unit that, when the fault detecting unit detects the fault, closes the bus by issuing an uncorrectable fault generation request to cause generation of an uncorrectable fault on the bus.

2. The cluster system according to claim 1, wherein each respective one of the servers further comprises:
 an input/output control unit that controls input and output of data for the bus and, when an fault interrupt signal for notifying generation of a fault on the bus is issued, stops control operation of input and output of data for the bus; and
 an interrupt signal issuance unit that, when the bus closing unit of the respective one of the servers issues the uncorrectable fault generation request, waits until the control operation of the input/output control unit stops, and issues a non-maskable interrupt signal for stopping the active system server to the active system server.

3. The cluster system according to claim 2, wherein, before issuing the non-maskable interrupt signal, the interrupt signal issuance unit issues a failover notification request signal that requests notification of a failover from the active system server to the standby system server.

4. The cluster system according to claim 2, wherein
 each of the servers further comprises a communication device and an onboard server management chip,
 a failover is requested from the active system server to the standby system server, after the bus is closed, via the communication device of each of the servers, and
 the failover is notified from the active system server to the standby system server, after the input/output control unit stops, via the onboard server management chip of each of the servers.

5. The cluster system according to claim 1, wherein a program that configures the bus closing unit of each of the servers is included in a set of modules that performs a basic input/output control of each of the servers.

6. A method of controlling a cluster system, wherein,
 in a cluster system where an active system server and a standby system server operate utilizing a shared disk, each of the servers includes: a disk input/output unit that accesses the shared disk by using data that is input and output via a predetermined bus; a fault detecting unit that, when a fault occurs in the active system server, detects the fault; and a bus closing unit, and,
 when the fault detecting unit of a respective one of the servers detects the fault, the bus closing unit of the respective one of the servers closes the bus by issuing an uncorrectable fault generation request to cause generation of an uncorrectable fault on the bus.

7. A non-transitory computer-readable recording medium that stores a control program of a cluster system, wherein,
 in a cluster system where an active system server and a standby system server operate utilizing a shared disk, each of the servers includes: a disk input/output unit that accesses the shared disk by using data that is input and output via a predetermined bus; a fault detecting unit that, when a fault occurs in the active system server, detects the fault; and a bus closing unit, and
 the control program causes a computer to execute a process in which the bus closing unit of a respective one of the servers, when the fault detecting unit of the respective one of the servers detects the fault, closes the bus by issuing an uncorrectable fault generation request to cause generation of an uncorrectable fault on the bus.

* * * * *